United States Patent
Lin et al.

(10) Patent No.: US 7,653,067 B2
(45) Date of Patent: Jan. 26, 2010

(54) BLOCK-BASED SEEKING METHOD FOR WINDOWS MEDIA AUDIO STREAM

(75) Inventors: Shin-Ping Lin, Jhubei (TW);
Chun-Ching Huang, Jhubei (TW)

(73) Assignee: SiliconMotion Inc., Hsinchu County (TW)

( * ) Notice: Subject to any disclaimer, the term of this patent is extended or adjusted under 35 U.S.C. 154(b) by 430 days.

(21) Appl. No.: 11/561,787

(22) Filed: Nov. 20, 2006

(65) Prior Publication Data

US 2007/0253422 A1 Nov. 1, 2007

(30) Foreign Application Priority Data

May 1, 2006 (TW) ............................... 95115492 A

(51) Int. Cl.
*H04L 12/56* (2006.01)
*G06F 7/00* (2006.01)

(52) U.S. Cl. ...................... 370/394; 381/124
(58) Field of Classification Search ................. 370/389, 370/394
See application file for complete search history.

(56) References Cited

U.S. PATENT DOCUMENTS

| | | | | |
|---|---|---|---|---|
| 6,128,597 A | * | 10/2000 | Kolluru et al. | ............... 704/500 |
| 6,370,502 B1 | * | 4/2002 | Wu et al. | ..................... 704/230 |
| 7,027,982 B2 | * | 4/2006 | Chen et al. | .................. 704/230 |
| 7,146,313 B2 | * | 12/2006 | Chen et al. | .................. 704/230 |
| 7,158,539 B2 | * | 1/2007 | Zhang et al. | ................ 370/473 |
| 7,383,180 B2 | * | 6/2008 | Thumpudi et al. | .......... 704/229 |
| 7,460,993 B2 | * | 12/2008 | Chen et al. | .................. 704/230 |

* cited by examiner

*Primary Examiner*—Chi H Pham
*Assistant Examiner*—Ahmed Elallam
(74) *Attorney, Agent, or Firm*—Pai Patent & Trademark Law Firm; Chao-Chang David Pai

(57) ABSTRACT

A block-based seeking method for Windows Media Audio (WMA) stream can be implemented in a portable electronic device with a first processor and a second processor. The first processor initially reads a WMA stream from a block-based storage device. Next, the WMA stream is transmitted to a memory of a second processor block by block. The first processor generates and transmits a block number before it transmits a block of data. Next, the second processor decodes the WMA stream packet by packet. If a discontinuous block number occurs, a desired position of the WMA stream is sought according to the discontinuous block number. Next, the second processor outputs decoded samples of the WMA stream.

17 Claims, 6 Drawing Sheets

BLOCK-BASED SEEKING METHOD FOR WINDOWS MEDIA AUDIO STREAM

RELATED APPLICATIONS

The present application is based on, and claims priority from, Taiwan Application Serial Number 95115492, filed May 1, 2006, the disclosure of which is hereby incorporated by reference herein in its entirety.

BACKGROUND

1. Field of Invention

The present invention relates to a seeking method for Windows Media Audio stream, and more particularly, to a block-based seeking method for Windows Media Audio stream.

2. Description of Related Art

Windows Media Audio (WMA) is a proprietary compressed audio file format developed by Microsoft and is a default audio file format supported by Windows Media Player (WMP). WMA is also popularly implemented on portable electronic devices, such as personal digital assistants (PDA), mobile phones and digital audio players. However, due to resource limitations, it is desirable to utilize specific hardware and software to improve the efficiency of the resource-limited portable device in order to support the WMA format file. For example, utilizing a generalized dual-processor (GDP) system or a multi-processor (MP) system is advantageous. The multi-processor system has a plurality of processors communicating with each other to separately deal with control commands and data processing.

WMA seeking approach is the querying and modifying of the current position within a WMA stream. There are some basic shortcomings to the conventional WMA seeking approach implemented in a multi-processor system. The first problem is that the communication between the processors is complicated. The second problem is that the system cannot handle seeking event while a packet of the WMA stream is being decoded.

Conventional seeking method for WMA stream implemented in portable devices is stream-based, i.e., the basic unit of data to process is bytes. How to provide a block-based seeking method for WMA stream in order to efficiently and conveniently implemented in a multi-processor system is an issue of great consequence.

SUMMARY

The present invention provides a block-based seeking method for the WMA stream. The method can be implemented in a portable electronic device with a first processor and a second processor. The method includes the following steps. The first processor reads a WMA stream from a block-based storage device and transmits the WMA stream to the second processor block by block. A block number is generated and transmitted before each block of data is transmitted; next, the WMA stream is transmitted to a memory of the second processor and the second processor decodes the WMA stream. The WMA stream is decoded packet by packet. Next, the second processor determines whether a discontinuous block number occurs. Next, if a discontinuous block number occurs, a desired position of the WMA stream is sought according to the discontinuous block number. Next, the second processor outputs decoded samples of the WMA stream.

According to certain embodiments, the block-based seeking method for WMA stream can further include the step of determining whether the memory has sufficient space; and if the memory does not have sufficient space, transmitting a buffer busy notification to the first processor by the second processor.

According to certain embodiments, the block-based seeking method for the WMA stream can further include the step of setting a flag in the second processor on condition that the second processor determines that a discontinuous block number occurs.

According to certain embodiments, the block-based seeking method for WMA stream can further include the step of flushing the memory.

According to certain embodiments, the block-based seeking method for WMA stream can further include the step of replacing data of the packet being decoded with zero on condition that the flag is set.

According to certain embodiments, the WMA stream is contained within an ASF container, the ASF container contains a header object and a data object, the header object contains a header size (H) and a file properties object and the file properties object contains a number of packets (P) and a packet size (Q).

According to certain embodiments, the block-based seeking method for the WMA stream can further include the step of: in response to determining that a discontinuous block number (b') occurs, calculating a stream offset (f') according to a block size (B) and the discontinuous block number (b').

According to certain embodiments, the block-based seeking method for the WMA stream can further include the step of calculating an estimated packet number (n') according to the estimated stream offset (f'), the header size (H) and the packet size (Q)

According to certain embodiments, the block-based seeking method for the WMA stream can further include the step of calculating a correction packet number (n") according to the estimated stream offset (f'), the packet size (Q) and the estimated packet number (n').

According to certain embodiments, the block-based seeking method for the WMA stream can further include the step of calculating a packet-aligned stream offset (f") according to the correction packet number (n"), the header size (H) and the packet size (Q).

According to certain embodiments, the block-based seeking method for the WMA stream can further include the step of calculating a block number of the desired position (b") according to the packet-aligned stream offset (f") and the block size (B).

According to certain embodiments, the block-based seeking method for the WMA stream can further include the step of calculating a block offset of the desired position (r") according to the packet-aligned stream offset (f"), the block number of the desired position (b") and the block size (B).

According to certain embodiments, the block-based seeking method for WMA stream can further include a step determining whether the block number of input data is greater than or equal to the block number of the desired position (b"); and if the block number of the input data is greater than or equal to the block number of the desired position (b"), clearing the flag (F) and continuing the step of decoding.

It is to be understood that both the foregoing general description and the following detailed description are by examples and are intended to provide further explanations of the invention as claimed.

BRIEF DESCRIPTION OF THE DRAWINGS

These and other features, aspects and advantages of the invention will become apparent by reference to the following description and accompanying drawings, which are given by way of illustration only, and thus are not limitative of the invention, wherein.

DESCRIPTION OF THE PREFERRED EMBODIMENTS

Figure 1:
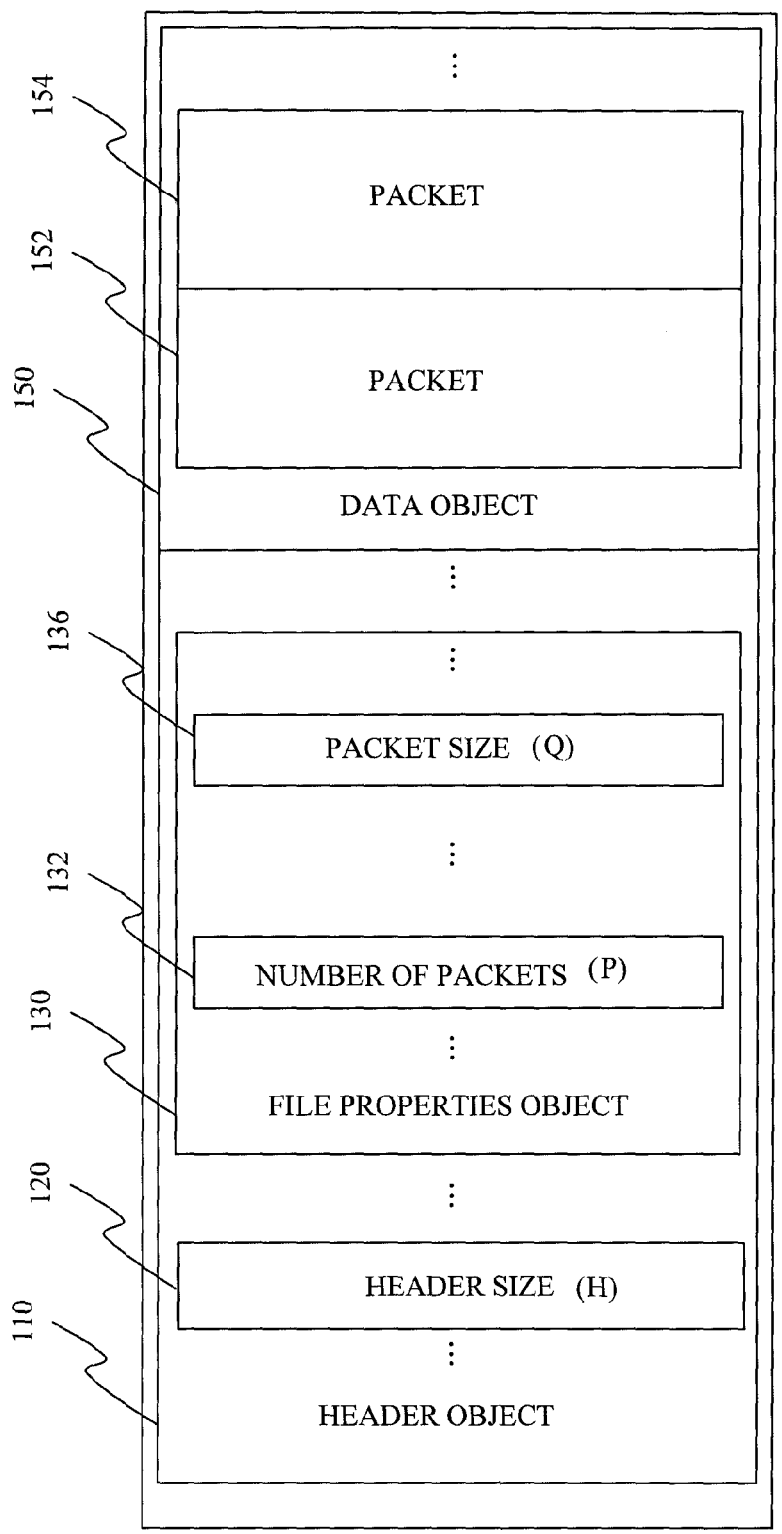
FIG. 1 illustrates an example of an ASF container with a WMA stream.

Advanced Streaming Format (ASF) is a well-known digital audio/video container format and WMA is the most common file type contained within an ASF container. FIG. 1 illustrates an example of an ASF container with a WMA stream. The ASF container 100 contains a header object 110 and a data object 150. The header object 110 contains a header size (H) 120 and a file properties object 130. The file properties object 130 contains number of packets (P) 132 and a packet size (Q) 136. The data object 150 includes a plurality of WMA stream packets, such as the packet 152 and the packet 154. The ASF container 100 can be stored in a block-based storage device, such as a hard disk or a flash memory device, and the packet size (Q) 136 may be larger or smaller than the size of a block.

Figure 2:
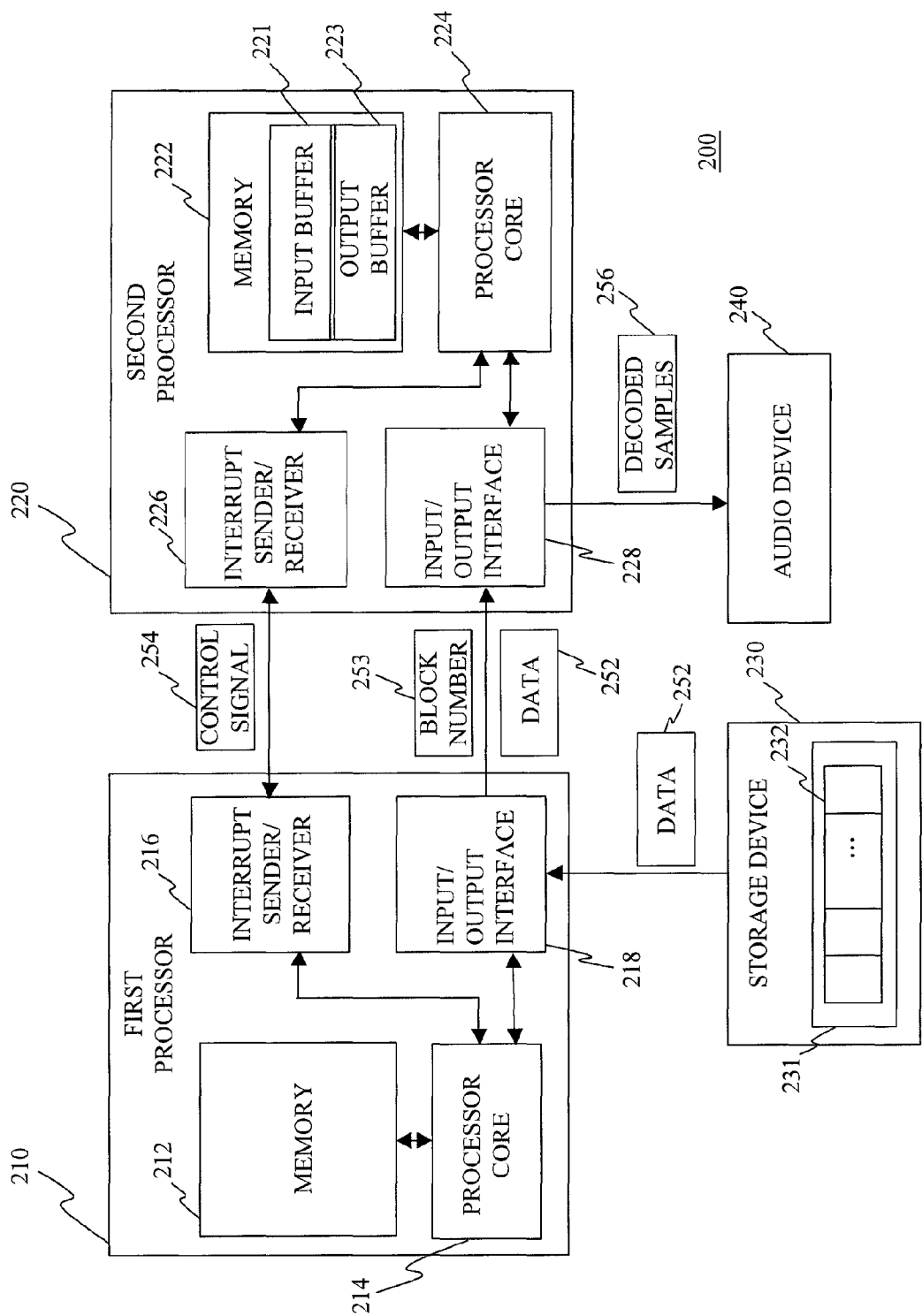
FIG. 2 is a block diagram of a system of the present invention for processing WMA streams.

FIG. 2 is a block diagram of a system of the present invention for processing WMA streams. The system 200 may be a portable electronic device with a first processor 210, a second processor 220, storage device 230 and an audio device 240. The first processor 210 may be an 8051 processor with a memory 212, a processor core 214, an interrupt sender/receiver 216 and an input/output interface 218. The first processor 210 can communicate with the second processor 220 by using an I/O interface access method or a Direct Memory Access (DMA) method.

The second processor 220 may be an ADSP-2181 digital signal processor with a memory 222, a processor core 224, an interrupt sender/receiver 226 and an input/output interface 228. The memory 222 includes an input buffer 221 and an output buffer 223. The storage device 230 may be a block-based storage device, such as a hard disk or a flash memory. A WMA stream 231 can be divided into a plurality of blocks 232. The first processor 210 and the second processor 220 may have a plurality of processor cores to improve the performance of the system 200.

With continued reference to FIG. 2, the first processor 210 is a control processor for reading at least one block of data 252 of the WMA stream 231 from the storage device 230 and generating a block number 253 for each block of data 252. The first processor 210 transmits the block number 253 and the block of data 252 to the second processor 220 by using the input/output interface 218. The first processor can communicate with the second processor by using a polling method or an interrupt handling method. The second processor 220 is a data processor for receiving the block number 253 and the block of data 252 by using input/output interface 228. The second processor 220 also decodes the block of data 252 and outputs decoded samples 256 of the WMA stream 231 to the audio device 240. The decoded samples 256 may be Pulse-Code Modulation (PCM) samples.

The first processor 210 and the second processor 220 can transmit a control signal 254 to each other by using the interrupt senders/receivers 216, 226. For example, the second processor 220 transmits a notification to the first processor 210 to indicate that the input buffer 221 is ready. Subsequently, the first processor 210 reads the block of data 252 from the storage device 230 and generates a block number 253 for the block of data 252. The first processor 210 sequentially transmits the block number 253 and the block of data 252 to the second processor 220. Next, the second processor 220 moves the block of data 252 to the input buffer 221 and determines whether the memory 222 has sufficient space. If the memory 222 has sufficient space, the second processor 220 receives another block of data. If the memory does not have sufficient space, the second processor 220 transmits a buffer busy notification to the first processor 210 to stop the data being transmitted.

Figure 3:
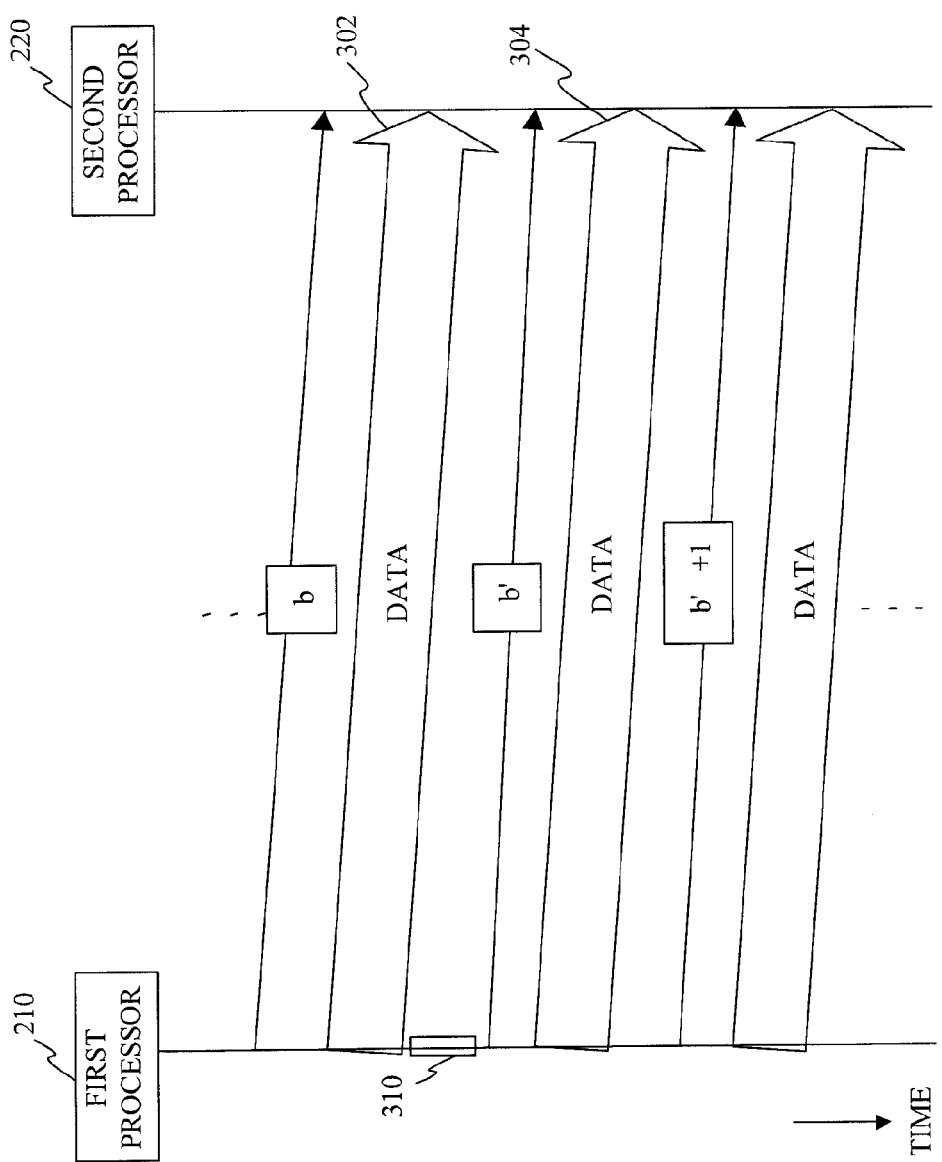
FIG. 3 is a chart showing the communications between the first processor and the second processor in FIG. 2.

FIG. 3 shows the communications between the first processor 210 and the second processor 220 in FIG. 2. For example, the first processor 210 generates and transmits a block number (b) to the second processor 220, and then transmits a block of data 302 corresponding to the block number (b) to the second processor 220. Next, the first processor 210 generates and transmits a block number (b') to the second processor 220, and then transmits another block of data 304 corresponding to the block number (b') to the second processor 220. The second processor 220 can determine whether a seeking event occurs by monitoring whether the block number (b) and the block number (b') are continuous integers. For example, the block number (b) and the block number (b') are not continuous integers, i.e. the block number (b') does not equal b+1, a seeking event 310 occurs. The second processor 220 can seek a desired position of the WMA stream according to the discontinuous block number (b') and output decoded samples of the WMA stream according to the desired position. Thus, the first processor 210 does not need to transmit a seeking notification to the second processor 220 and the communications between the first processor 210 and the second processor 220 can be reduced. Moreover, reducing the amount of communications between the first processor 210 and the second processor 220 can have the added benefit of reduced waiting time. It is worth noting that the seeking event 310 can be registered as an exception if the second processor 220 has exception handling capability. A flag can be set to indicate that the seeking event occurs if the second processor 220 does not have exception handling capability otherwise.

Figure 4:
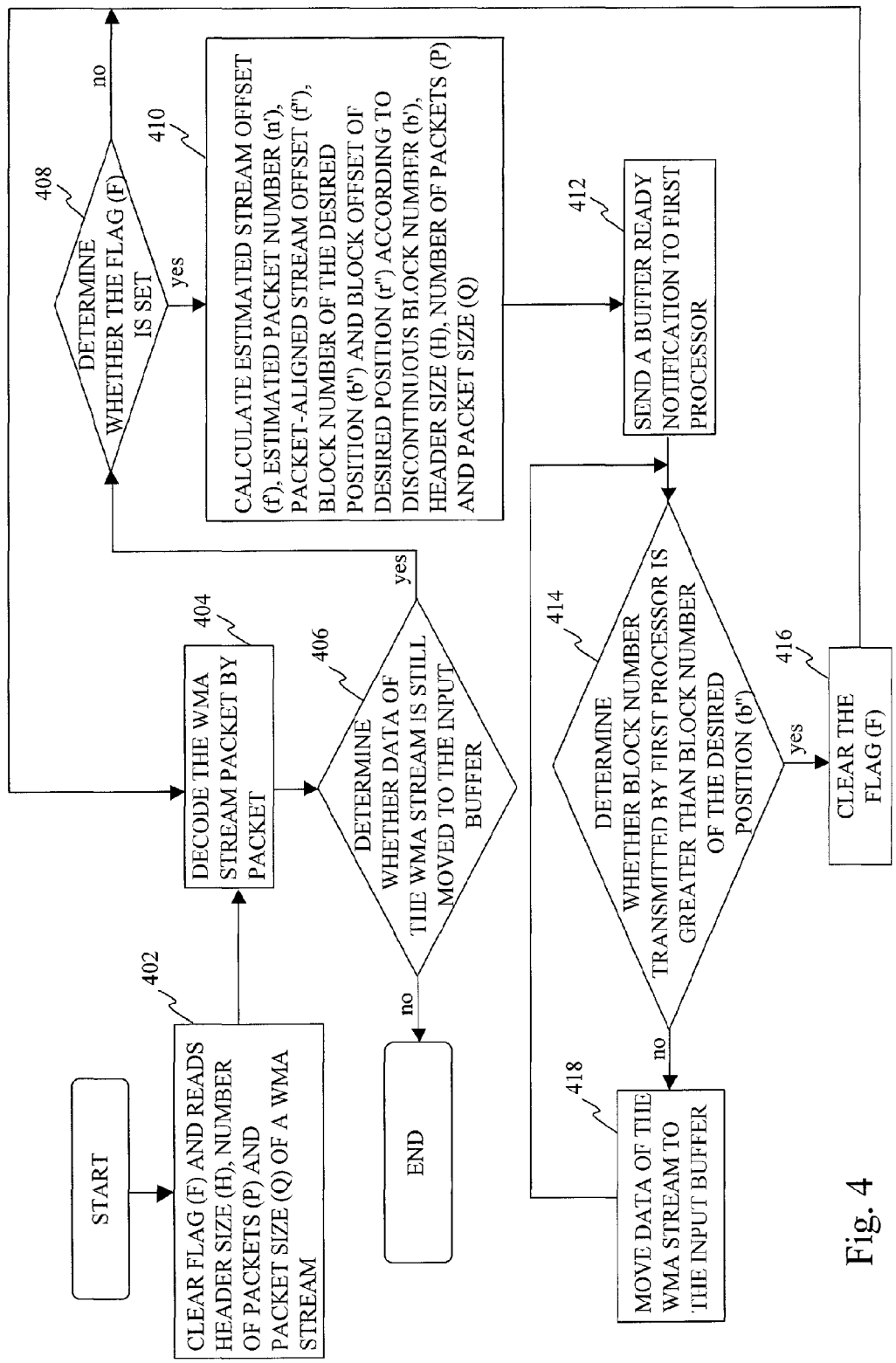
FIG. 4 is a flowchart showing the decoding method applied to the second processor in FIG. 2 to decode the WMA stream in FIG. 1.

FIG. 4 is a flowchart showing the decoding method applied to the second processor in FIG. 2 to decode the WMA stream in FIG. 1. Referring to FIG. 1, FIG. 2 and FIG. 4, in step 402, the second processor 220 clears a flag (F) and reads a header size (H), a number of packets (P) and a packet size (Q) of a WMA stream. Next, in step 404, the second processor 220 decodes the WMA stream packet by packet. The second processor 220 receives and moves data of the WMA stream to the input buffer 221 block by block while the second processor 220 decodes the WMA stream 231.

Figure 5:
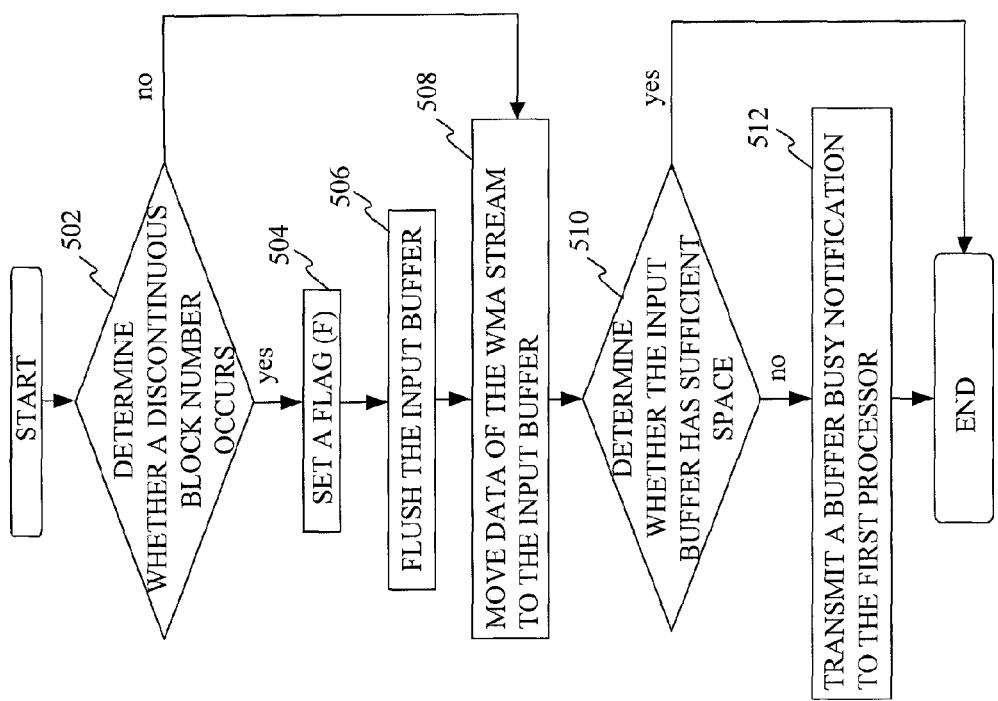
FIG. 5 is a flowchart showing that the second processor in FIG. 2 moves data to the input buffer.

FIG. 5 is a flowchart showing that the second processor 220 in FIG. 2 receives and moves data to the input buffer 221. Referring to FIG. 2 and FIG. 5, in step 502, the second processor 220 determines whether a discontinuous block number occurs. A flag (F) can be set to indicate that seeking event occurs if a discontinuous block number occurs (step 504), and then the input buffer 221 is flushed (step 506). Next, in step 508, data of the WMA stream 231 is moved to the input buffer 221. Next, in step 510, the second processor 220 determines whether the input buffer 221 has sufficient space. A buffer busy notification is transmitted to the first processor 210 by the second processor 220 if the input buffer 221 does not have sufficient space (step 512).

Figure 6:
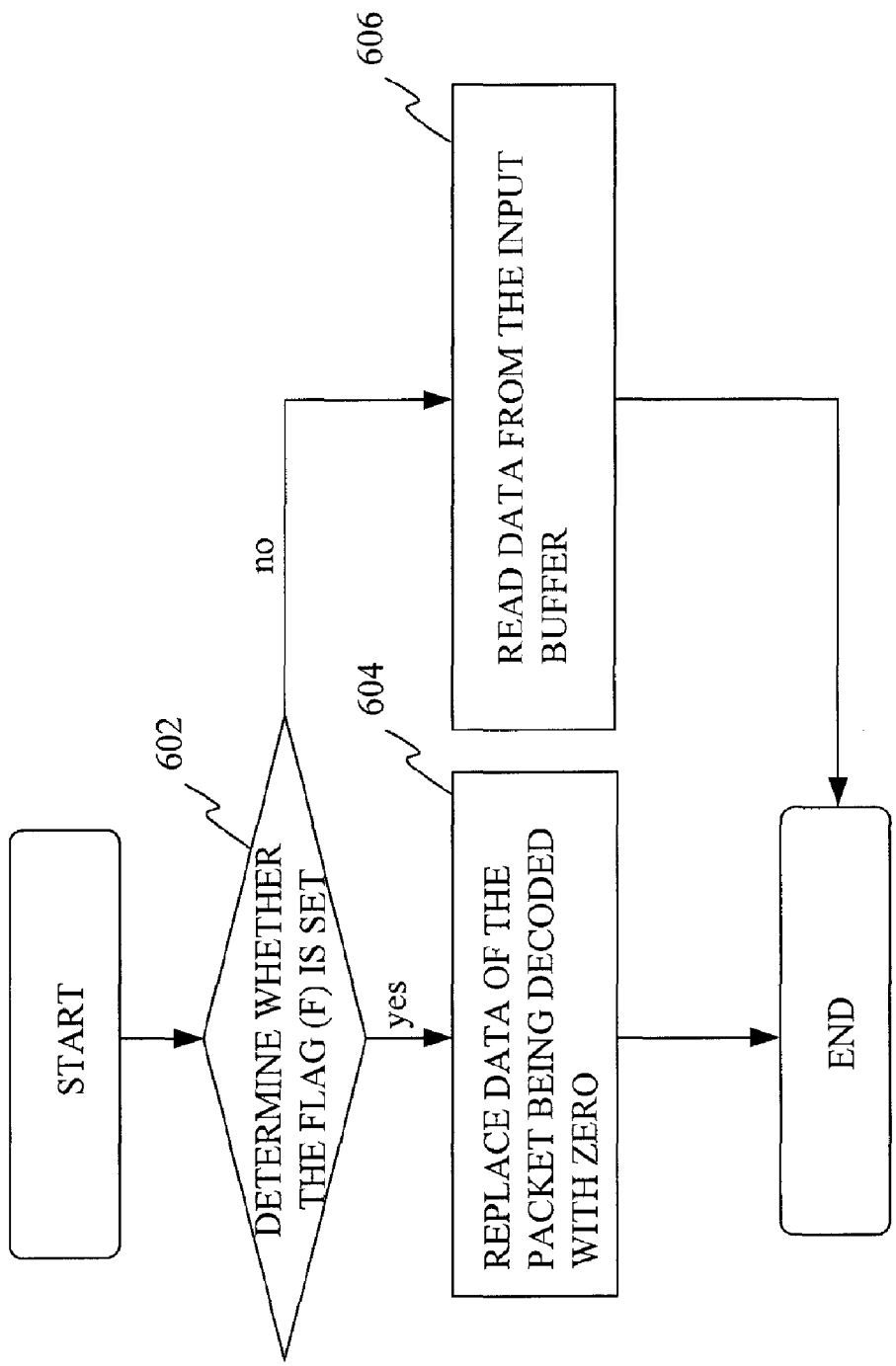
FIG. 6 is a flowchart showing that the second processor in FIG. 2 accelerates the decoding process when seeking event occurred.

FIG. 6 is a flowchart showing that the second processor 220 in FIG. 2 accelerates the decoding process when seeking event occurs. In step 602, the second processor 220 determines whether the flag (F) is set. In step 606, the second processor 220 reads data from the input buffer 221 if the flag (F) is not set. The second processor 220 replaces data of the packet being decoded with zero to accelerate the decoding process if the flag (F) is set (step 604). Thus, seeking process can be executed soon.

Referring again to FIG. 4, in step 404, the second processor 220 decodes the packets of the WMA stream 231 and the next procedure is as follows. In step 406, the second processor 220 determines whether data of the WMA stream 231 is still moved to the input buffer 221. In step 408, the second processor 220 determines whether the flag (F) is set if data of the WMA stream 231 is still moved to the input buffer 221. If the flag (F) is set, in step 410, the second processor 220 calculates a estimated stream offset (f'), an estimated packet number (n'), a packet-aligned stream offset (f"), a block number of the desired position (b") and a block offset of the desired position (r") according to the discontinuous block number (b'), the header size (H), the number of packets (P) and the packet size (Q).

The value of estimated stream offset (f') can be calculated according to the block size (B) and the discontinuous block number (b') by using equation (1).

$$f' = b' \times B \quad (1)$$

The value of estimated packet number (n') can be calculated according to the estimated stream offset (f'), the header size (H) and the packet size (Q) by using equation (2).

$$n' = \begin{cases} \left\lfloor \dfrac{f' - H}{Q} \right\rfloor & f' - H > 0 \\ 0 & f' - H \leq 0 \end{cases} \quad (2)$$

$\lfloor \bullet \rfloor$ denotes as a downward truncation operator

The decoding method can be improved by using a value of correction packet number (n") instead of the value of estimated packet number (n'). The value of correction packet number (n") can be calculated according to the estimated stream offset (f'), the packet size (Q) and the estimated packet number (n') by using equation (3).

$$\begin{cases} n'' = n' + 1 & f' - Q \times n' \neq 0 \\ n'' = n' & f' - Q \times n' = 0 \end{cases} \quad (3)$$

The value of packet-aligned stream offset (f") can be calculated according to the correction packet number (n"), the header size (H) and the packet size (Q) by using equation (4).

$$f'' = H + Q \times n'' \quad (4)$$

The value of block number of the desired position (b") can be calculated according to the packet-aligned stream offset (f") and the block size (B) by using equation (5).

$$b'' = \left\lfloor \dfrac{f''}{B} \right\rfloor \quad (5)$$

The value of block offset of the desired position (r") can be calculated according to the packet-aligned stream offset (f"), the block number of the desired position (b") and the block size (B) by using equation (6).

$$r'' = f'' - b'' \times B \quad (6)$$

If block number of input data is greater than or equal to the block number of the desired position (b") and block offset of input data is greater than or equal to the block offset of the desired position (r"), i.e. the current position is the desired position, the second processor 220 starts to decode the WMA stream again and output the decoded samples of the WMA stream. With continued reference to FIG. 4, in step 412, the second processor 220 sends a buffer ready notification to indicate that the input buffer 221 is ready after the step 410 is finished. Next, in step 414, the second processor 220 determines whether a block number (b) transmitted by the first processor 210 is greater than the block number of the desired position (b"). Next, in step 416, the second processor 220 clears the flag (F) and proceeds to step 404 to decode the WMA stream if the block number transmitted by the first processor 210 is greater than the block number of the desired position (b"). Otherwise, in step 418, the second processor 220 receives and moves data to the input buffer 221. It is worth noting that the input buffer 221 can be flushed if the input buffer 221 is full.

According to preferred embodiments mentioned above, the block-based seeking method for WMA stream can be implemented using a device specified assembly language, C language or other high-level language. Moreover, the block-based seeking method for WMA stream has the following advantages. Firstly, a block number is generated and transmitted by a first processor before a block of data is transmitted. The second processor can determine whether the seeking event occurs by monitoring whether a discontinuous block number occurs. Thus, the communications including acknowledgements and notifications between the first processor and the second processor for dealing with the seeking event can be reduced. Moreover, reducing the amount of communications can have the added benefit of reducing waiting time. Secondly, seeking event can be handled when a packet is being decoded. Thirdly, the communication protocol between the first processor and the second processor is simple and easy to implement in a portable device.

While the invention has been described by way of example and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A block-based seeking method for Windows Media Audio (WMA) stream, implemented in a portable electronic device with a first processor and a second processor, the method comprising:
   transmitting a notification to the first processor from the second processor to indicate that an input buffer of a memory of the second processor is ready;
   reading a plurality of blocks of data of a WMA stream from a block-based storage device by the first processor;
   transmitting the WMA stream to the memory of the second processor block by block, wherein the WMA stream is transmitted to the second processor by the first processor and a block number is generated and transmitted before each block of data is transmitted;
   decoding the WMA stream packet by packet by the second processor to generate decoded samples;
   determining whether a discontinuous block number occurs by the second processor;
   if a discontinuous block number occurs, seeking a desired position of the WMA stream according to the discontinuous block number; and
   outputting the decoded samples of the WMA stream by the second processor.

2. A block-based seeking method for WMA stream as recited in claim 1, further comprising the step of determining whether the memory has sufficient space; and if the memory does not have sufficient space, transmitting a buffer busy notification to the first processor by the second processor.

3. A block-based seeking method for WMA stream as recited in claim 1, further comprising: in response to determining that a discontinuous block number occurs, setting a flag.

4. A block-based seeking method for WMA stream as recited in claim 3, further comprising the step of flushing the memory.

5. A block-based seeking method for WMA stream as recited in claim 3, further comprising the step of determining whether the flag is set when the second processor is decoding a packet of the WMA stream.

6. A block-based seeking method for WMA stream as recited in claim 5, further comprising: in response to determining that the flag is set, replacing data of the packet being decoded with zero.

7. A block-based seeking method for WMA stream as recited in claim 1, wherein the WMA stream is contained within an ASF (Advanced Streaming Format) container, the ASF container contains a header object and a data object, the header object contains a header size (H) and a file properties object and the file properties object contains a number of packets (P) and a packet size (Q).

8. A block-based seeking method for WMA stream as recited in claim 7, further comprising: in response to determining that a discontinuous block number occurs, calculating an estimated stream offset (f') according to a block size (B) and the discontinuous block number (b').

9. A block-based seeking method for WMA stream as recited in claim 8, further comprising the step of calculating an estimated packet number (n') according to the estimated stream offset (f'), the header size (H) and the packet size (Q).

10. A block-based seeking method for WMA stream as recited in claim 9, further comprising the step of calculating a correction packet number (n") according to the estimated stream offset (f'), the packet size (Q) and the estimated packet number (n').

11. A block-based seeking method for WMA stream as recited in claim 10, further comprising the step of calculating a packet-aligned stream offset (f") according to the correction packet number (n"), the header size (H) and the packet size (Q).

12. A block-based seeking method for WMA stream as recited in claim 11, further comprising the step of calculating a block number of the desired position (b") according to the packet-aligned stream offset (f") and the block size (B).

13. A block-based seeking method for WMA stream as recited in claim 12, further comprising the step of calculating a block offset of the desired position (r") according to the packet-aligned stream offset (f"), the block number of the desired position (b") and the block size (B).

14. A block-based seeking method for WMA stream as recited in claim 13, further comprising the step of determining whether the block number of input data is greater than or equal to the block number of the desired position (b"); and if the block number of the input data is greater than or equal to the block number of the desired position (b"), clearing the flag (F) and continuing the step of decoding.

15. A block-based seeking method for WMA stream as recited in claim 1, wherein the first processor communicates with the second processor by using a polling method or an interrupt handling method.

16. A block-based seeking method for WMA stream as recited in claim 1, wherein the decoded samples are Pulse-Code Modulation (PCM) samples.

17. A block-based seeking method for WMA stream as recited in claim 1, wherein the first processor communicates with the second processor by using an I/O interface access method or a Direct Memory Access (DMA) method.

* * * * *